United States Patent [19]

Hagen et al.

[11] 3,972,797
[45] Aug. 3, 1976

[54] ELECTRODE FOR ELECTROCHEMICAL MACHINING

[75] Inventors: Siegfried Hendrik Hagen; Cornelis van Osenbruggen; Herman Anton; Joseph Reemers; Gerrit Verspui, all of Emmasingel, Eindhoven, Netherlands

[73] Assignee: U.S. Philips Corporation, New York, N.Y.

[22] Filed: Dec. 6, 1974

[21] Appl. No.: 530,279

[30] Foreign Application Priority Data
Dec. 12, 1973 Netherlands............... 7316992

[52] U.S. Cl.................... 204/290 R; 204/129.55
[51] Int. Cl.²................ C25F 7/00; C25F 3/00; C25F 3/14
[58] Field of Search............... 204/290 R, 129.55

[56] References Cited
UNITED STATES PATENTS
3,352,770  11/1967  Crawford et al........... 204/129.55 X
3,485,744  12/1969  Schaffner................ 204/290 R Primary Examiner—F.C. Edmundson
Attorney, Agent, or Firm—Frank R. Trifari; Norman N. Spain

[57] ABSTRACT

Electrode for electrochemically machining electrically conducting workpieces, in particular machining them by removal of material, which electrode is locally coated with a screening layer consisting of a polycrystalline semiconductor material, which layer preferably comprises two component layers of p and n-conductivity type respectively.

4 Claims, 1 Drawing Figure

U.S. Patent    Aug. 3, 1976    3,972,797
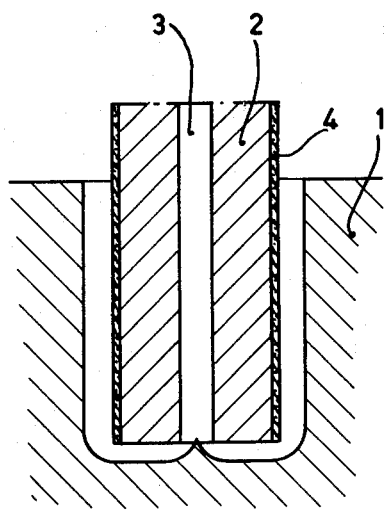

ELECTRODE FOR ELECTROCHEMICAL MACHINING

The invention relates to an electrode for electrochemical machining, in particular for shaping electrically conducting workpieces by removing material therefrom.

Electrochemical machining is performed in an electrolyte solution in which the workpiece is arranged as the anode and the tool as the cathode, an electric current being made to flow between them. The workpiece, which is connected as the anode, is dissolved, for example in the form of a metal hydroxide, whilst hydrogen is evolved at the total surface. The advantage of this method of machining is that no wear or attack of the tool takes place.

The method is described inter alia in the handbook. "Electrochemical Machining" by A. E. de Barr and D. A. Oliver, published by MacDonald, London (1968), and in two articles by Kao-Wen Mao CM study in a closed-cell system in J. Electrochem. Soc. 118, page 7 sqq. (1971).

The commonly used electrolytes are solutions of a salt in water, as a rule solutions of NaCl or $NaNO_3$.

To ensure a sufficient degree of accuracy in this method of machining the spacing between the tool and the workpiece is maintained small, for example from 0.01 to 0.1 mm. To keep this spacing substantially constant the tool must be moved towards the workpiece at a given speed (feed rate) which is equal to the rate at which the workpiece is dissolved. The electrolyte is pumped through the electrode gap at a comparatively high speed to remove the metal hydroxide produced, the hydrogen evolved and the heat generated. The generation of heat in the liquid electrolyte is comparatively large, because in practice electrolysis currents of up to 500 A per $cm^2$ of machining area may be used.

The precision of this machining method, which in itself is not high, is considerably improved by providing insulating material on the electrode at the areas at which current flow is unwanted. In the accompanying drawing an electrode for drilling holes is shown schematically by way of example.

In the FIGURE, 1 denotes the workpiece, 2, the electrode, 3 a duct for supplying electrolyte and 4 the insulation on the electrode.

If high-precision machining is desired, as mentioned hereinbefore, the insulating layer 4 must be as thin as possible, for example 0.01 mm or even less.

Various insulating materials have been proposed. Layers of epoxy resins containing different types of hardeners have the disadvantage of susceptility to water absorption. During their application they absorb water from the ambient atmosphere, which, it is true, can be removed by heating, however, with consequent porosity and formation of holes. Silicon resins are somewhat better in this respect but still unsatisfactory. Layers of polyurethane have the disadvantage of absorbing hydrogen with consequent decomposition. Layers of polyester imide also suffer from this drawback, although to a considerably lesser degree. Moreover, all the said organic coatings can only be applied if the electrode is not very complicated. Finally, when the layers have a thickness desired for precision machining they are not sufficiently insulating and tend to become detached owing to the ensuing evolution of hydrogen.

When insulating layers of inorganic materials are used, their thicknesses may be considerably smaller, in general between 0.1 and 5 $\mu m$. Unfortunately these layers show leakage currents such that their useful life is greatly restricted. In the search for more suitable insulating materials layers of aluminium oxide or tantalum oxide deposited by various anodic treatments, layers of enamel and layers of silicon oxide obtained by oxidation of gaseous silanes at the heated electrode surface have been tried.

The present invention provides a locally insulated electrode having a considerably increased useful life and a leakage current which even at a small layer thickness is negligible small as compared with electrodes having the aforedescribed insulation. In addition, electrodes having complicated surfaces can readily be coated.

An electrode according to the invention is characterized in that the local insulation consists of a layer of a polycristalline semiconductor which in the electrolyte solution has a resistance such that the ratio of the current density at the operational area of the electrode to that at the insulated part of the electrode is at least 5.

Preferably the layer comprises at least two superposed component layers consisting of semiconductor materials of different types and/or of n and p conductivity types. An attractive embodiment comprises two component layers, one consisting of p-type semiconductor material in contact with the electrode surface and the other of n-type semiconductor material in contact with the surface of the p-type semiconductor.

Very good results are obtained with silicon carbide.

By way of example two embodiments of electrodes according to the invention and their manufacture will now be described.

EXAMPLE 1

A tungsten rod of length 15 cm and diameter 0.5 mm is exposed at a temperature of 1,175°C to a gas stream of 5.6 l/min which comprises hydrogen containing 5.2% by volume of methyltrichlorosilane ($CH_3SiCl_3$). Pyrolysis causes the formation of SiC on the electrode surface. If a stream of hydrogen containing 1% by volume of $B_2H_6$ at a rate of 40 $cm^3$/min is added to the gas steam, p-type SiC is obtained. An n-type layer is obtained by adding, instead of the hydrogen which contains $B_2H_6$, a stream of nitrogen at a rate of 30 $cm^3$/min to the gas steam. A p-n junction is obtained by doping successively with $B_2H_6$ and with $N_2$.

An electrode of length 1 cm made from the resulting rod and having a layer of thickness 15 $\mu m$ comprising two component layers of p-type and n-type SiC respectively is used in the embodiment shown in the FIGURE, which layer has mechanically been removed from the end face and from the area at which the electrode is clamped, to enable the passage of electric current and the establishment of electric contact respectively. The electrolyte used in the electrolytic machining process is an aqueous solution of $NaClO_3$ which has a conductivity of 0.15 $ohm^{-1} cm^{-1}$ and is circulated at a rate of 20 m/s. At the location of the uncovered electrode surface the current density is 250A/$cm^2$, whilst at the location of the double layer it is 0,2A/$cm^2$.

After machining holes of diameter 0.6 mm with a total depth of 600 mm in nickel-chromium steel, no perceptible wear is found. When a layer of an epoxy resin of the same thickness is used, this layer is worn off entirely at a machining depth of only 2 mm.

In an electrode provided with a single layer of p type SiC of thickness 20 μm, the ratio of the current density at the site of the uncovered tungsten to that at the site of the p-type SiC layer is more than 5.

EXAMPLE 2

A molybdenum rod of length 10 cm and diameter 0.5 mm is exposed at a temperature of 1,100°C to a gas steam of 12 l/min which consists of hydrogen containing 0.15% by volume of $SiH_4$. By pyrolysis a layer of silicon is produced on the electrode surface. If a stream of hydrogen containing $10^{-7}$ % volume of $B_2H_6$ is added to the gas steam at a rate of 15 $cm^3$/min, p-type silicon is obtained.

An n-type layer is obtained if, instead of the hydrogen containing $B_2H_6$, hydrogen containing $PH_3$ (phosphine) in an amount of $10^{-7}$ % by volume is added at a rate of 15 $cm^3$ to the gas stream which contains $SiH_4$.

A pn junction is obtained by doping successively with $B_2H_6$ and with $PH_3$.

An electrode of length 1 cm made from the resulting rod and provided with a layer of thickness 30 μm which comprises two component layer of p-type and n type silicon respectively has a useful life which is considerably longer than that of an electrode coated with an epoxy resin.

What is claimed is:

1. An electrode for electrochemically machining an electrically conducting workpiece in an electrolyte solution, said electrode being locally coated with an insulating layer at areas at which current flow is undesired, said insulating coating consisting essentially of two superimposed layers, one layer being a p-type semiconductor polycrystalline layer and the other layer being an n-type semiconductor polycrystalline layer, said insulating coating having a resistance in the electrolyte solution employed such that the ratio of the current density at the noncoated area of the electrode to the current density at the coated area of the electrode is at least 5.

2. The electrode of claim 1 wherein the outer layer is an n-type semiconductor layer and the inner layer is a p-type semi-conductor layer.

3. The electrode of claim 2 wherein the outer layer is an n-type polycrystalline silicon carbide layer and the inner layer is a p-type semiconductor polycrystalline silicon carbide layer.

4. The electrode of claim 2 wherein the outer layer is an n-type polycrystalline silicon layer and the inner layer is a p-type semiconductor polycrystalline silicon layer.

* * * * *

UNITED STATES PATENT AND TRADEMARK OFFICE
CERTIFICATE OF CORRECTION

PATENT NO. : 3,972,797

DATED : August 3, 1976

INVENTOR(S) : SIEGFRIED HENDRIK HAGEN ET AL

It is certified that error appears in the above-identified patent and that said Letters Patent are hereby corrected as shown below:

In the Title page, Item [75], lines 2 and 3,

"Herman Anton;Joseph Reemers;" should read:

-- Herman Anton Joseph Reemers; --.

Signed and Sealed this

Fourteenth Day of June 1977

[SEAL]

Attest:

RUTH C. MASON
Attesting Officer

C. MARSHALL DANN
Commissioner of Patents and Trademarks